United States Patent [19]

Bergman et al.

[11] 4,173,360

[45] Nov. 6, 1979

[54] FLEXIBLE SEALING JOINT

[75] Inventors: Lawrence A. Bergman, Euclid, Ohio; John H. Gorndt, Erie, Pa.

[73] Assignee: Lord Corporation, Erie, Pa.

[21] Appl. No.: 821,448

[22] Filed: Aug. 3, 1977

Related U.S. Application Data

[63] Continuation of Ser. No. 621,433, Oct. 10, 1975, abandoned.

[51] Int. Cl.² .............. F16L 11/12; F16L 27/04; F16L 35/00; F16L 59/16
[52] U.S. Cl. ................................ 285/51; 285/223; 285/263; 285/53
[58] Field of Search .............. 285/166, 223, 263, 167, 285/276, 280, 281, 51, 49

[56] References Cited

U.S. PATENT DOCUMENTS

| | | | |
|---|---|---|---|
| 1,925,335 | 9/1933 | Murphy | 285/166 X |
| 2,504,634 | 4/1950 | Boschi | 285/223 X |
| 2,582,995 | 1/1952 | Laurent | 220/25 |
| 2,687,229 | 8/1954 | Laurent | 220/46 |
| 2,693,975 | 11/1954 | Smith | 288/24 |
| 2,713,503 | 7/1955 | Ekholm | 285/166 |
| 2,760,673 | 8/1956 | Laurent | 220/46 |
| 3,071,422 | 1/1963 | Hinks | 308/237 |
| 3,168,334 | 2/1965 | Johnson | 285/223 X |
| 3,504,902 | 4/1970 | Irwin | 285/263 X |
| 3,504,903 | 4/1970 | Irwin | 285/263 X |
| 3,504,904 | 5/1970 | Irwin et al. | 285/263 X |
| 3,519,260 | 7/1970 | Irwin | 285/263 X |
| 3,680,895 | 8/1972 | Herbert et al. | 285/223 X |
| 3,712,645 | 1/1973 | Herter | 285/167 X |
| 3,734,546 | 5/1973 | Herbert et al. | 285/49 |
| 3,848,899 | 11/1974 | Smith | 285/167 X |
| 4,068,864 | 1/1978 | Herbert et al. | 285/167 X |
| 4,068,868 | 1/1978 | Ohrt | 285/263 |

FOREIGN PATENT DOCUMENTS

| | | | |
|---|---|---|---|
| 821890 | 11/1951 | Fed. Rep. of Germany | 285/263 |
| 674506 | 11/1964 | Italy | 285/263 |

Primary Examiner—Wayne L. Shedd
Attorney, Agent, or Firm—Maurice R. Salada; James W. Wright

[57] ABSTRACT

A flexible joint for a conduit transporting fluid under pressure includes a pair of spaced rigid rings. An annular flexible element is disposed between and sealingly engaging the rings so as to define a pair of annular exposed side surfaces on the element. One side surface is exposed to pressurized fluid flowing through the conduit, thereby creating a pressure differential across the flexible element between its side surfaces. To resist the load that results from the pressure differential, the flexible element incorporates a body of elastomer that has a thickness between the rings which decreases from the one side surface of the element to the other side surface. The flexible element can thus resiliently accommodate relative motion between the rings, while providing a fluid-tight, pressure-resistant seal.

18 Claims, 4 Drawing Figures

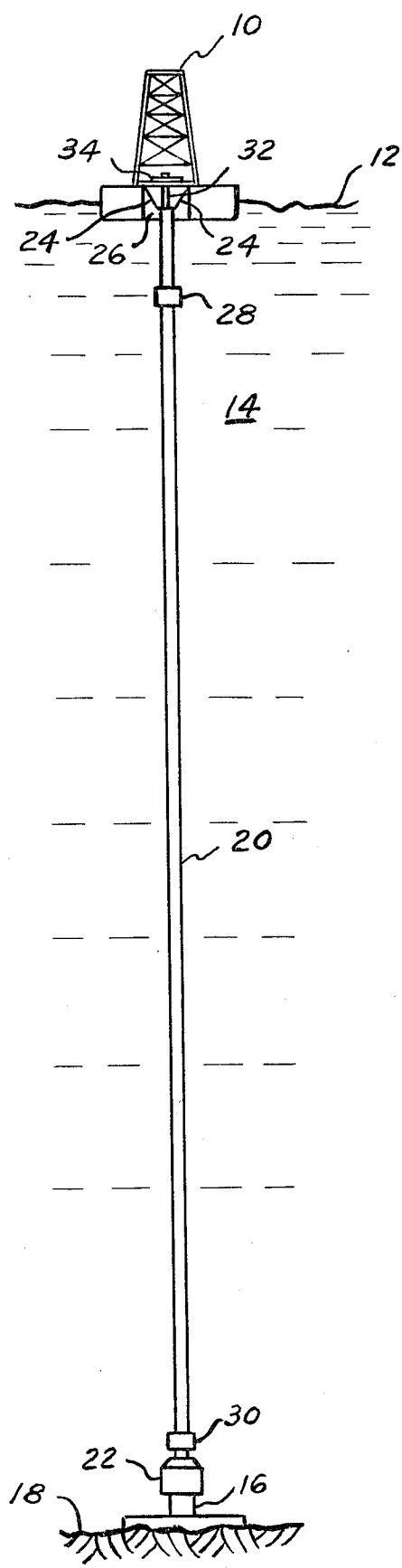
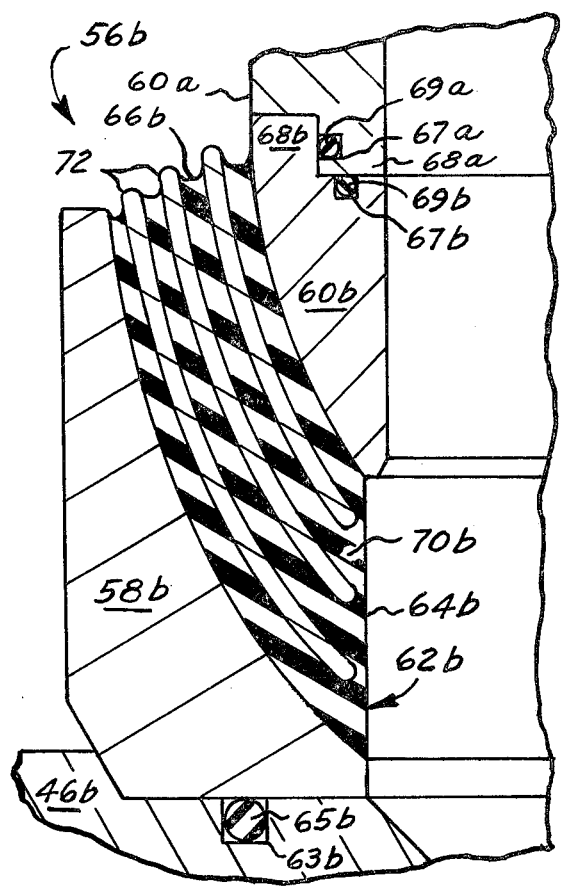
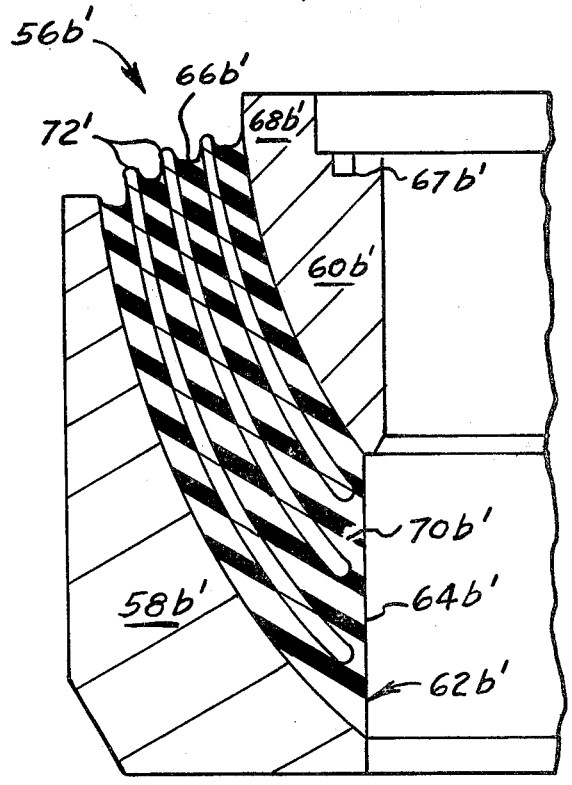

FLEXIBLE SEALING JOINT

This is a continuation of application Ser. No. 621,433, filed Oct. 10, 1975 now abandoned.

BACKGROUND OF THE INVENTION

In recent years, successful methods have been developed for drilling oil and gas wells at underwater locations. As a result, an oil or gas well may be drilled and completed so that the entire wellhead assembly is positioned at a depth at least sufficient to avoid being a navigation hazard to ocean-going vessels (e.g., at or near the ocean floor). Such offshore or underwater wells may be drilled from a vessel, such as a drilling barge, or from a platform mounted on legs extending downwardly to the ocean floor.

A drilling barge or similar vessel is particularly susceptible to movements in response to wave action, even though the barge is anchored. Drilling that is done from a floating vessel must accommodate both lateral and vertical movements of the vessel. Accordingly, drilling equipment such as drilling strings and riser lines, which extend downwardly from the drilling vessel to the ocean floor, must possess a degree of flexibility sufficient to prevent rupture when the drilling vessel moves slightly from its designated location. Typically, the pipe in a drilling string is of a sufficienctly small diameter and has sufficient strength to be flexible enough to avoid damage. The riser line or marine conductor pipe, on the other hand, has a relatively large diameter and encloses the drilling string so that drilling "mud" may be returned upwardly in the annulus between the inner wall of the riser pipe and the outer wall of the drill string. The increased diameter and rigidity of the riser pipe, as compared to the drill string, requires that the riser pipe include at least one coupling or joint assembly that can be readily flexed, can withstand high internal and external fluid pressures, and can hold up under the abrasive action of fluids, well tools and other objects that pass through the riser pipe.

One type of flexible joint used in riser pipes consists of a ball member having a precisely machined spherical surface and a socket member having a complementary, precisely machined spherical surface. The joint is flexed by sliding one of the spherical surfaces relative to the other. Resilient O-rings help seal the joint at the interface between the sliding surfaces. The flexural movement of such a ball joint is impaired, however, when the joint is subjected to high pressures. The joint is also subject to frictional wear and deterioration of both the sliding surfaces and the O-ring seals, which requires frequent repair or replacement of the joint.

Another type of flexible joint for fluid conduits, such as marine riser pipes, utilizes annular flexible elements disposed between flanges secured to adjacent ends of different sections of conduit. The flexible elements comprise alternating layers of a rigid and a resilient material, which are normally metal and an elastomer. The layers or laminations may be annular with flat surfaces, as in the pipe joint of Johnson U.S. Pat. No. 3,168,334, or annular with spherical surfaces, as in the flexible joint of Herbert et al U.S. Pat. No. 3,680,895. Laminated flexible elements permit the necessary flexural movement of a joint and also function as seals. A joint incorporating a laminated element has no "moving" parts and is not subject to the frictional wear encountered with the ball-and-socket joints discussed above. Other flexible pipe joints utilizing laminated flexible elements are described and illustrated in Herbert et al U.S. Pat. Nos. 3,390,899, 3,734,546 and 3,853,337.

While joints utilizing laminated flexible elements avoid the wear problem of convention ball-and-socket joints, the laminated elements have a tendency to rupture and fail upon exposure to high axial loads and high pressure differentials. In particular, the elastomer layers of laminated elements, while capable of carrying high compressive loads, can only withstand relatively low tension loads. Thus, when two adjacent lengths of pipe are subjected to forces that tend to move the lengths axially away from each other, the laminated flexible elements are likely to fail. Efforts to solve the problem of tension loads have included the use of tension bars to carry the tension loads in preference to the laminated flexible elements. Pairs of laminated flexible elements may also be utilized in a joint such that at least one of the flexible elements is always loaded in compression, regardless of the relative axial movement between adjacent lengths of pipe. Reducing or eliminating tensile loads on a laminated flexible element also reduces the likelihood of rupture due to high pressure differentials on the element. Similarly, bonding adjacent laminations into an integral member increases the pressure-resistance of the laminated element.

SUMMARY OF THE INVENTION

The present invention is directed to a flexible joint for a fluid conduit which provides an improved high-pressure dynamic seal. According to the invention, the joint comprises a pair of spaced rigid rings, which are interposed between the adjacent ends of two lengths of conduit. An annular flexible element is disposed between and sealingly engages the rings so as to define a pair of annular exposed side surfaces on the flexible element. One of the side surfaces, preferably the radially innermost surface, is to be exposed to pressurized fluid flowing through the conduit, thereby creating a pressure differential across the flexible element between its side surfaces. To resist the load that results from the pressure differential, the flexible element incorporates a body of elastomer that has a thickness between the rings which decreases from the one side surface of the element to the other side surface. Because of its tapering thickness, the body of elastomer is dammed or held against rupturing movement in response to the pressure of the fluid in the conduit. The flexible element can thus resiliently accommodate relative motion between the rings, and hence the lengths of conduit, while providing a fluid-tight, pressure-resistant seal between the rings.

In one embodiment of the invention, the flexible element also includes a plurality of spaced apart, annular shims of a substantially inextensible material embedded in the body of elastomer. The shims improve the compression load carrying capabilities of the elastomer. To insure a "damming" action on the body of elastomer, the thicknesses of the shims are not included when the thickness of the body of elastomer is determined. The thickness of each shim may be constant or tapered. The shims may taper in thickness from the high pressure side surface of the flexible element to the low pressure side surface if the spacing between the rigid rings tapers in a corresponding direction and to an extent sufficient to compensate for the tapering shim thicknesses. If the spacing between the rigid rings remains constant, for example, the shims may be tapered in thickness from the low pressure side of the flexible element to the high pressure side to provide the necessary "damming" effect. In a preferred embodiment, each shim and the body of elastomer are annular in one plane and arcuate in a perpendicular plane or planes. The arcuate configurations of successive shims may be defined by arcs of circles of increasing diameters so that each shim and the body of elastomer is a spherically shaped annulus.

The joint of the present invention is normally incorporated in a pipe joint assembly for flexibly connecting together two lengths of pipe. One such assembly may include a cylindrical housing having an annular body and an annular flange at each end which extends radially inwardly of the housing body. Each one of a pair of tubular members of smaller diameter than the housing has a flange at one end extending radially outwardly. The tubular members are received through opposite open ends of the housing so that the flanges of the tubular members are disposed between the flanges of the housing. The other ends of the tubular members project from opposite open ends of the housing. A pair of opposed sealing joints according to the present invention are disposed between opposed flanges. Both joints may be disposed between the flanges of the tubular members or each joint may be disposed between the flange of a different tubular member and the adjacent flange of the housing.

BRIEF DESCRIPTION OF THE DRAWINGS

For a better understanding of the invention, reference may be made to the following description of an exemplary embodiment, taken in conjunction with the figures of the accompanying drawings, in which:

FIG. 1 is a diagrammatical view of a drilling barge at an offshore location positioned above a wellhead assembly on the ocean floor;

FIG. 3 is a fragmentary view, on an enlarged scale, of the joint illustrated in FIG. 2; and FIG. 4 is a view corresponding to FIG. 3 but illustrating an alternate embodiment of the joint of the present invention.

DESCRIPTION OF A PREFERRED EMBODIMENT

Figure 2:
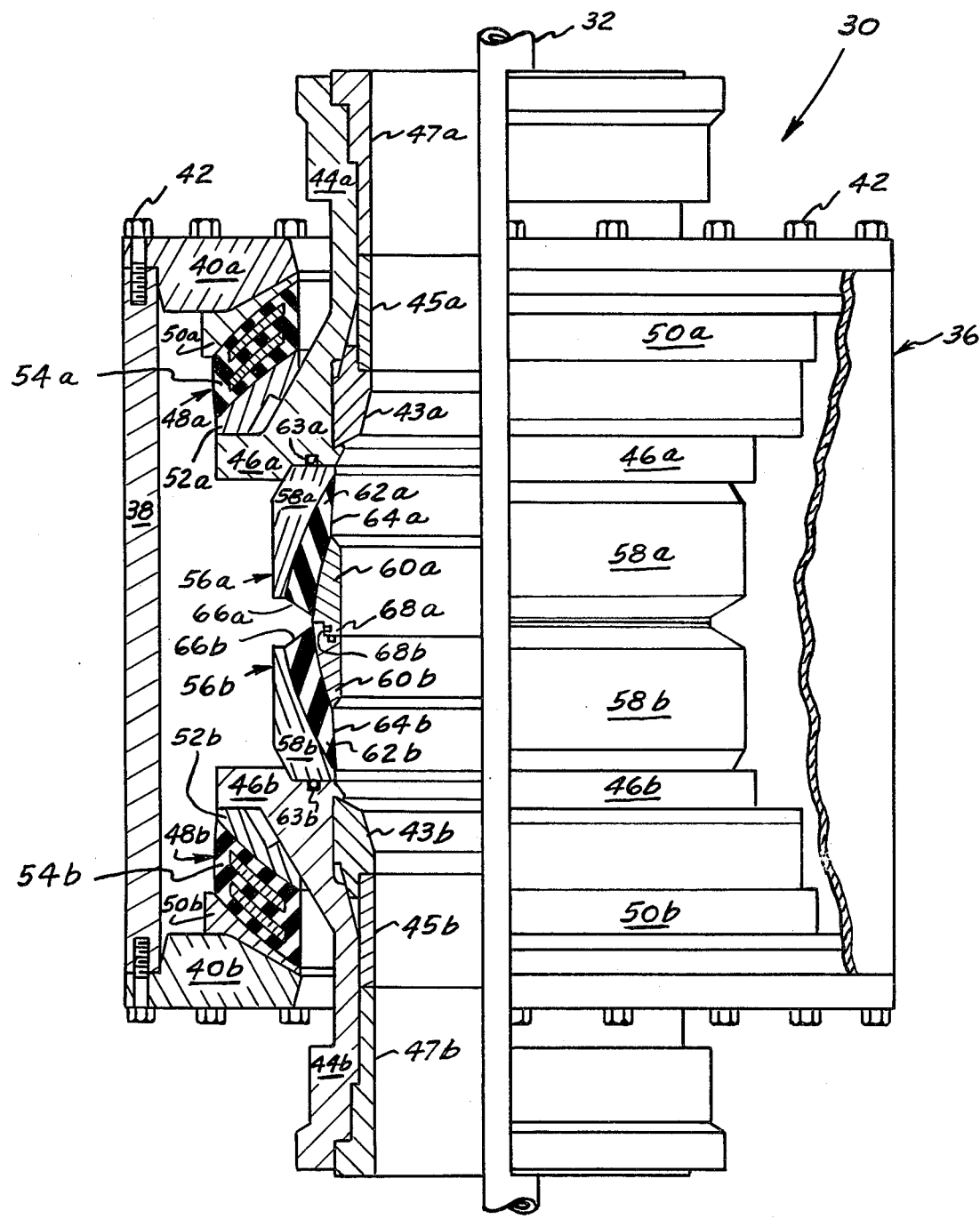
FIG. 2 is a longitudinal view, partly in cross section, of one pipe joint assembly illustrated in FIG. 1 and incorporating the joint of the present invention.

FIG. 1 of the drawings illustrates a drilling barge 10 floating on the surface 12 of a body of salt water 14. Below the barge 10, an underwater wellhead assembly 16 is positioned on the ocean floor 18. The lower end of a large diameter marine riser pipe 20 is secured to the wellhead assembly 16 by a wellhead connector 22. The upper end of the marine riser pipe 20 is secured to the barge 10 in any conventional manner, such as by cables 24. The cables 24 position the top of the marine riser pipe 20 more or less centrally in a drilling slot 26 that extends through the barge 10. During drilling operations, a string of drilling pipe 32 passes through a rotary table 34 on the drilling barge 10 and extends throughout the length of the riser pipe 20 into the well.

Although the riser pipe 20 is depicted as a continuous pipe or tubular member in FIG. 1, the pipe is normally made up of a multiplicity of relatively short tubular sections secured together in any conventional manner. Positioned in the riser 20, adjacent each of its ends, are flexible pipe joint assemblies 28 and 30. Joint assemblies 28 and 30 accommodate the major lateral movements of the riser pipe 20 due to movements of the barge 10, for example. Inasmuch as the flexible pipe joint assemblies 28 and 30 are essentially identical in construction, they will be described in detail with reference only to the joint 30, as shown in FIG. 2.

The pipe joint assembly 30 has a cylindrical outer housing 36 that comprises an open-ended tubular or annular body 38 and a pair of annular flange members 40a and 40b. The flange members 40a and 40b are positioned at opposite ends of the body 38 and are releasably secured to the body by lug bolts 42, for example. When mounted on the body 38, the flange members 40a and 40b extend radially inwardly from the body.

Adjacent the flange 40a of the housing 36 is a tubular member 44a that extends through the central opening in the flange 40a. A flange 46a is formed at the end of the tubular member 44a which is inside the housing 36. The flange 46a extends radially outwardly of the tubular member 44a and overlaps the flange 40a of the housing 36. The overlapping or interfering relationship of the flanges 40a and 46a requires the flange 40a to be separable from the body 38 of the housing 36 to permit assembly of the tubular member 44a within the housing. An identical tubular member 44b that has a flange 46b is disposed adjacent the other end of the housing 36 in a corresponding overlapping relationship with the flange 40b. Annular replaceable wear bushings 43a, 43b, 45a, 45b, 47a and 47b cover the interior circumference of each of the tubular members 44. The bushings 43, 45 and 47 protect the tubular members 44 against the abrasive action of well tools passing through the joint assembly 30 and drilling mud flowing through the assembly outside the drilling pipe 32.

Between the flanges 40a and 46a and between the flanges 40b and 46b are annular laminated bearings 48a and 48b, respectively. Each of the bearings 48 includes two relatively massive, annular end plates 50 and 52 and an intermediate flexible element 54. The end plates 50 and 52 are received on appropriately configured surfaces of the flanges 40 and 46, respectively. The interfaces between the plates 50 and 52 and the flanges 40 and 46 are not sealed. The flexible element 54 is bonded to the end plates 50 and 52 and incorporates a plurality of alternating layers of elastomeric material and a material that is substantially inextensible or nonextensible compared to the elastomeric material. The inextensible layers are preferably formed of steel, while the elastomeric layers are preferably formed of natural rubber. Other inextensible and elastomeric materials may be substituted for the steel and rubber where appropriate. Alternate elastomeric materials include synthetic rubber, while alternate inextensible materials include other metals, fiberglass, and reinforced plastics. The layers of each flexible element 54 and the adjacent surfaces of the associated end plates 50 and 52 have circular configurations in longitudinal section. The over-all spherical shapes of the bearings 48a and b permit the bearings to function as universal joints with the relative motion between adjacent relatively rigid components (i.e., the inextensible layers and the end plates) being accommodated by flexing or shearing of the elastomer layers.

Interposed between the flanges 46a and 46b of the tubular members 44 are a pair of flexible joints 56a and b. Each of the joints 56a and b includes two relatively massive, rigid rings 58 and 60 and an annular flexible element 62 located between the rings. The flexible element 62, which includes elastomer, is relatively soft or more flexible compared to the flexible elements 54 of the bearings 48. The difference in flexibility or stiffness may be achieved by utilizing a "softer" elastomer or by constructing the flexible element 62 to have a lower shape factor than the flexible elements 54, for example. The element 62 is bonded to each of the rings 58 and 60 so as to define on the flexible element a pair of annular side surfaces 64 and 66 which are exposed or free. As in the bearings 48a and b, the flexible elements 62a and b and the adjacent surfaces of the end rings 58a and b have circular shapes in longitudinal section. The joints 56a and b may thus function as universal joints, like the bearings 48a and b.

The end rings 58a and b of the joints 56a and b are carried on and engage surfaces of the flanges 46a and b appropriately configured to prevent radial shifting of the rings. Grooves 63a and b formed in the adjacent surfaces of the flanges 46a and b receive resilient O-rings 65a and b (See also FIG. 3) to seal the interfaces between the flanges and the rings 58. End rings 60a and 60b engage each other and fit together. Axially extending, annular flanges 68a and 68b on the rings 60a and b overlap in an axial direction to prevent relative radial movement between the rings. As best shown in FIG. 3, grooves 67a and 67b are formed in the rings 60a and b to accept resilient O-rings 69a and b, which seal the interface between the rings 60. None of the rings 58a, 58b, 60a or 60b is secured to the adjacent metal surface that the ring contacts. The sealing action of the O-rings 65a and b and the O-ring 69b is insured by constantly maintaining a compression load on the joints 56a and 56b, as will be described herein.

When the various components of the joint assembly 30 are assembled as shown in FIG. 2, the exposed ends of the tubular members 44a and 44b are connected to the ends of adjacent lengths of riser pipe (not shown). The riser pipe 20, throughout its length, is normally maintained in tension. This tension load, which is transmitted to the joint assembly 30, is carried by compression loading of the laminated elastomeric bearings 48a and 48b. The load is applied through the flanges 46a and b and is transmitted to the housing 36. Since a compression load on the bearings 48a and b will result in deflection of the elastomer in the bearings, the flanges 46a and b of the tubular members 44a and b will tend to move away from each other and away from the joints 56a and b. To prevent such movement from interrupting the seals at the interfaces between flanges 46 and rings 58 and between rings 60a and 60b, the internal components of joint assembly 30 are predeflected and thus preloaded, on assembly, between the housing flanges 40a and 40b. The assembly predeflection or preload deflects the joints 56a and b in preference to the bearings 48a and b due to the difference in the stiffnesses of the flexible elements 54 and 62. Thus, when the tension load on the riser pipe 20 is transmitted to the tubular members 44a and 44b and the bearings 48a and 48b, the resulting deflection of the bearings is not sufficient to relieve completely the compression load on the joints 56a and 56b. Consequently, the O-rings 65a, h 65b and 69b are always loaded in compression to seal the interfaces between flanges 46 and rings 58 and between ring 60a and ring 60b. The preload also provides limited frictional engagement between adjacent metal surfaces to prevent relative rotation between the flanges 46 and the rings 58, for example.

The spherical configurations of the joints 56a and 56b, together with the spherical configurations of the bearings 48a and 48b, permit angular misalignments between the lengths of riser pipe 20 on either side of the joint assembly 30. Angled relative orientations of the lengths of riser pipe 20 are accommodated by shearing of the elastomer in the elements 54a, 54b, 62a and 62b, as indicated above. The elastomer in the flexible elements 54a, 54b, 62a and 62b will also shear to accommodate rotational movements of the riser pipe sections about their longitudinal axes. During their deflections, the flexible elements 62 maintain a fluid-tight seal against the highly pressurized and abrasive drilling mud, for example, that flows through the riser pipe 20 along the outside of the drilling pipe 32. (As noted above, the bearings 48 need not provide a fluid-tight seal against the sea water surrounding the joint assembly 30.) The sealing action of the joints 56a and 56b is facilitated by their unique design, as discussed in detail below with particular reference to joint 56b.

As discussed above and illustrated in FIG. 2, the radially inner side surfaces 64 of the flexible elements 62 of joints 56 are normally exposed to a highly pressurized fluid, such as drilling mud. The drilling mud is at a pressure substantially higher than the pressure of the fluid, such as sea water, to which the opposite side surfaces 66 of the flexible elements 62 are exposed. The pressure differential across the elements 62 tends to force the elements radially outwardly from between the rigid rings 58 and 60. To counteract the effects of the pressure differential, the flexible elements 62 comprise outwardly tapered bodies of elastomer 70. As best shown in FIG. 3 with regard to joint 56b, the body of elastomer 70b has a thickness (measured substantially normal to the curved surfaces of rings 58b and 60b) which decreases from the high pressure side surface 64b of the flexible element 62b to the low pressure side surface 66b of the element. The tapering thickness of the body of elastomer 70b, which has been exaggerated for purposes of illustration in FIG. 3, is achieved by tapering the spacing between the adjacent arcuate surfaces of the rigid rings 58b and 60b. The taper effectively results in the elastomer being "dammed" or retained between the two rings 58b and 60b against radially outward and upward rupturing movement. This positive mechanical interlock provides a more effective high pressure seal than is found in similar flexible joints that rely solely on the strength of the bond between the body of elastomer and the adjacent metal parts.

To increase the capacity of the joint 56b of FIG. 3 to withstand pressure differentials across the body of elastomer 70b and/or to reduce the stress in the elastomer for a given pressure differential, metal shims 72 are embedded in the elastomer 70b at spaced apart locations between the rings 58b and 60b. The shims 72, which are substantially inextensible compared to the elastomer 70b, are continuous annular members and have arcuate configurations in longitudinal section. The arcuate lines of the shims 72 are preferably circular arcs. Such a configuration best accommodates the ball-and-socket type operation of the joint 56b and is more convenient to manufacture than other curved shapes. The arcs may be taken from a single circle of fixed diameter, or from different diameter circles such that the diameters of successive shims increase with increasing radial distance of the particular shim from the nominal center of the joint. The spacing between the individual shims 72 and between the endmost shims and the adjacent surfaces of the rings 58b and 60b decreases from the high pressure side 64b of the flexible element 62b to the low pressure side 66b. With shims defined by circular arcs, the tapering in the spacing is achieved by axially displacing the center of the circle that defines the arcuate shape of each shim from the center of the circle defining the arcuate configuration of the adjacent, radially inwardly located shim. While the damming effect in joint 56b is provided by a decrease in the spacing between the end rings 58b and 60b, the tapering of the thickness of the elastomer body 70b may be accomplished through other techniques. For example, the thicknesses of the shims 72 may be tapered from the low pressure side 66b of the flexible element 62b to the high pressure side 64b without tapering the spacing between the end rings 58b and 60b.

It should be noted that the use of tapered layers of elastomer in a laminated elastomeric bearing is known in the art, as illustrated by FIG. 3 of Krotz U.S. Pat. No. 3,179,400 and by FIG. 7 of Hinks U.S. Pat. No. 3,071,422. Neither patent, however, recognizes the construction and use of such an elastomeric bearing as a sealing pipe joint.

FIG. 4 of the application illustrates an alternate embodiment of the joints 56. In the embodiment of FIG. 4, not only does the thickness of the body of elastomer 70b' diminish from the high pressure side surface 64b' of the flexible element 62b' to the low pressure surface 66b', but the shims 72' similarly taper from the high pressure side to the low pressure side of the flexible element 62b'. The tapering of the shims 72' permits a reduction in the amount of metal used in the flexible element 62b', as compared to the element 62b of FIG. 3. The basis for tapering the shims may best be understood by considering that the annular shims 72' are everywhere subjected to radially directed forces which place each shim 72' in what may be termed "hoop tension". The "hoop tension" is greatest at the edges of the shims 72' adjacent the high pressure side 64b' of the flexible element 62b'. The tension diminishes with increasing distance from the longitudinal axis of the pipe joint assembly 30. Thus, the ends of the shims 72' which are uppermost in FIG. 4 are subject to a lesser "hoop tension" than the lower ends of the shims. The smaller "hoop tension" requires a smaller thickness of metal to resist the tension load and the shims may be tapered accordingly.

It will be understood that the embodiment described above is merely exemplary and that persons skilles in the art may make many variations and modifications without departing from the spirit and scope of the invention. For example, individual rings 58 and 60 may be fabricated in one piece with adjacent metal components such as flanges 46. The joints 56 may also be utilized as combined bearings and seals in a variety of different pipe joint assemblies, such as those shown in the various Figures of Herbert et al U.S. Pat. No. 3,680,895. All such modifications and variations are intended to be within the scope of the invention as defined in the appended claims.

What is claimed is:

1. In a pipe joint assembly for fluid conduits that receive fluid under a pressure greater than an external ambient pressure on the conduits, said assembly comprising
    a cylindrical housing including an annular housing body and an annular flange at each end extending radially inwardly of said housing body, and
    a pair of tubular members of smaller diameter than said housing, each tubular member including a flange at one end extending radially outwardly of said member, said flanges of the tubular members being disposed between the flanges of the housing and the other ends of the tubular members projecting from opposite ends of the housing for attachment to fluid conduits,
    the improvement of two annular joints disposed within the housing, each joint comprising:
        (a) a pair of spaced rigid rings, and
        (b) an annular flexible element disposed between the rings and sealingly engaging opposed surfaces of the rings so as to define a pair of annular exposed side surfaces of said flexible element, the flexible element including a body of elastomer which when measured substantially normal to at least one of the opposed surfaces of the rings has a tapered thickness between the rings that decreases from the radially innermost side surface to the other side surface of the flexible element, the body of elastomer being closely confined in its tapered configuration along surfaces that extend from the radially innermost side surface to the other side surface of the flexible element so as to resist deflection of the elastomer from between the rings in response to pressure exerted on the radially innermost side surface of the flexible element,
    one ring of one joint being in load and motion transmitting engagement with the flange of one tubular member and being sealingly engaged with said one tubular member, one ring of the other joint being in load and motion transmitting engagement with the flange of the other tubular member and being sealingly engaged with said other tubular member, the other ring of each joint being sealingly engaged with a fluid-tight portion of the pipe joint assembly such that the two joints together define at least part of a fluid-tight passageway that interconnects the tubular members to permit a flow of fluid between the tubular members, the joints being oriented such that the radially innermost side surface of each flexible element is exposed to fluid in said passageway and to pressure exerted by fluid in the passageway, the radially innermost side surface being the only side surface of each flexible element which is exposed to fluid in said passageway, each flexible element resiliently accommodating relative motion between the rings that engage the element and providing a fluid-tight seal that is particularly resistant to pressure exerted on the radially innermost side surface of the element.

2. A pipe joint assembly, according to claim 1, wherein each annular flexible element is bonded to each of the corresponding rigid rings.

3. A pipe joint assembly, according to claim 1, wherein each flexible element also includes a plurality of spaced annular shims or substantially inextensible material embedded in the body of elastomer, the thickness of the body of elastomer being exclusive of the thicknesses of the shims.

4. A pipe joint assembly, according to claim 3, wherein each shim has a thickness which decreases from the radially innermost side surface of the flexible element to the other side surface.

5. A pipe joint assembly, according to claim 3, wherein each shim and each body of elastomer is annular in one plane and arcuate in a plane perpendicular to said one plane.

6. A pipe joint assembly, according to claim 5, wherein the arcuate configuration of each shim is defined by an arc of a circle.

7. A pipe joint assembly, according to claim 6, wherein each shim and each body of elastomer is a spherically shaped annulus.

8. A pipe joint assembly, according to claim 1, which also includes an annular laminated bearing fabricated to alternating annular layers of elastomeric material and substantially inextensible material disposed between each flange of the housing and an adjacent flange of a tubular member, the two annular joints being disposed between the flanges of the tubular members with the other rigid rings of the two joints sealingly engaging one another.

9. In a pipe joint assembly for a conduit that receives fluid under a pressure greater than an external ambient pressure on the conduit, said assembly comprising
  a first annular member including a radially extending flange, and
  a second annular member spaced from and axially aligned with the first annular member, the second annular member including a radially extending flange that is spaced from and disposed in opposed relation to the flange of the first annular member,
  the improvement of an annular joint disposed between said flanges, said joint being fluid-tight and comprising an annular flexible element having a pair of annular exposed side surfaces and a pair of annular and opposed end surfaces, the flexible element including
  (a) a body of elastomer which when measured substantially normal to at least one of the end surfaces of the flexible element has a tapered thickness that decreases from the radially innermost side surface to the other side surface of the element, the body of elastomer being closely confined in its tapered configuration along surfaces that extend from the radially innermost side surface to the other side surface of the flexible element so as to resist deflection of the elastomer from between the flanges in response to pressure exerted on the radially innermost side surface of the flexible element, and
  (b) a plurality of spaced annular shims of a substantially inextensible material embedded in the body of elastomer, the thickness of the body of elastomer being exclusive of the thicknesses of the shims,
  the joint being in load transmitting engagement with the flange of at least one of the first and second annular members and the end surfaces of the flexible element of the joint being sealingly engaged with fluid-tight portions of the pipe joint assembly so that the flexible element defines at least part of a fluid-tight passageway that interconnects the annular members to permit a flow of fluid between the annular members, the joint being oriented such that the radially innermost side surface of the flexible element is exposed to fluid in the passageway and to pressure exerted by fluid in the passageway, the radially innermost side surface being the only side surface of the flexible element which is exposed to fluid in the passageway, the flexible element resiliently accommodating relative motion between the annular members and providing a fluid-tight seal that is particularly resistant to pressure exerted on the radially innermost side surface of the flexible element.

10. A pipe joint assembly, according to claim 9, wherein the annular flexible element is bonded to the fluid-tight portions of the pipe joint assembly with which the flexible element is sealingly engaged.

11. A pipe joint assembly, according to claim 9, wherein the shims and the body of elastomer are annular in one plane and arcuate in a plane perpendicular to said one plane.

12. A pipe joint assembly, according to claim 11, wherein the shims and the body of elastomer are spherically shaped annuli.

13. A pipe joint assembly, according to claim 9, wherein each shim has a thickness that decreases from the radially innermost side surface of the flexible element to the other side surface.

14. A flexible joint for a conduit that receives fluid under a pressure greater than an external ambient pressure on the conduit, said joint comprising
  a pair of spaced rigid rings,
  an annular flexible element bonded to and between the rings and sealingly engaging opposed surfaces of the rings so as to define a pair of annular exposed side surfaces of said flexible element, the flexible element including a body of elastomer which when measured substantially normal to at least one of the opposed surfaces of the rings has a tapered thickness between the rings that decreases from the radially innermost one of the side surfaces to the other side surface of the flexible element, and
  a plurality of spaced annular shims of a substantially inextensible material embedded in the body of elastomer, the thickness of the body of elastomer being determined exclusive of the thicknesses of the shims,
  the body of elastomer being closely confined in its tapered configuration along surfaces that extend from the one side surface to the other side surface of the flexible element so as to resist deflection of the elastomer from between the rings in response to pressure exerted on the one side surface of the flexible element, the flexible element resiliently accommodating relative motion between the rings that engage the element and providing a fluid-tight seal that is particularly resistant to pressure exerted on the one side surface of the element.

15. A joint, according to claim 14, wherein each shim has a thickness which decreases from the one side surface of the flexible element to the other side surface.

16. A joint, according to claim 14, wherein each shim and the body of elastomer are annular in one plane and arcuate in a plane perpendicular to said one plane.

17. A joint, according to claim 16, wherein the arcuate configuration of each shim is defined by an arc of a circle.

18. A joint, according to claim 17, wherein each shim and the body of elastomer are spherically shaped annuli.

* * * * *